(12) United States Patent
Westerweck (10) Patent No.: US 6,628,902 B2
(45) Date of Patent: Sep. 30, 2003

(54) MIRROR ADJUSTMENT METHOD AND APPARATUS

(75) Inventor: Lothar Westerweck, Hollywood, FL (US)

(73) Assignee: Concord Camera Corp., Hollywood, FL (US)

( * ) Notice: Subject to any disclaimer, the term of this patent is extended or adjusted under 35 U.S.C. 154(b) by 0 days.

(21) Appl. No.: 10/066,298

(22) Filed: Jan. 31, 2002

(65) Prior Publication Data

US 2003/0142972 A1 Jul. 31, 2003

(51) Int. Cl.[7] .............................................. G03B 17/00
(52) U.S. Cl. ..................... 396/378; 359/694; 396/385; 396/386; 396/377
(58) Field of Search ................................. 396/351, 385, 396/377, 378, 386, 374; 348/341; 359/694

(56) References Cited

U.S. PATENT DOCUMENTS

| | | | | |
|---|---|---|---|---|
| 4,318,133 A | * | 3/1982 | Ohtake ......................... 348/376 |
| 5,115,267 A | * | 5/1992 | Kondo et al. ................. 396/377 |
| 5,130,740 A | * | 7/1992 | Suda et al. ................... 396/111 |
| 5,715,490 A | * | 2/1998 | Ishito ........................... 396/378 |
| 5,721,995 A | * | 2/1998 | Katsura et al. ............... 396/351 |
| 6,330,400 B1 | * | 12/2001 | Bittner et al. ................ 455/424 |

* cited by examiner

*Primary Examiner*—Russell Adams
*Assistant Examiner*—Michael Dalakis
(74) *Attorney, Agent, or Firm*—Scott L. Lampert; Kerry Sisselman (57) ABSTRACT method and apparatus for aligning an optical element in an optical sub-assembly is provided. Pivoting fine tuning plates connected to the main body of the sub-assembly are used to set the height and angle of the optical element. The optical element is connected on a pin through the optical element frame between two portions of the main body. Pivoting the fine tuning plate with a cam causes the optical element pin to cant, adjusting the position and/or angle of the optical element. In one embodiment of the present invention, a laser may be used to better align the optical element.

19 Claims, 7 Drawing Sheets

MIRROR ADJUSTMENT METHOD AND APPARATUS

FIELD OF THE INVENTION

The present invention relates to the field of image capture devices, and more particularly, to a method and apparatus for aligning the mirror system in a camera.

BACKGROUND OF THE INVENTION

In an image capture system that uses mirrors to deflect an image to a viewfinder or an image sensor, it is important to properly align the mirrors for proper use.

The method and apparatus of the present invention permits the mirrors in an image capture system to be easily aligned.

SUMMARY OF THE INVENTION

What is provided is a method and apparatus of aligning an optical element, such as a lens or mirror used to deflect an image, in an optical sub-assembly using pivoting fine tuning plates connected to the main body of the sub-assembly. The optical element is connected between two portions of the main body on a pin through the optical element frame. Pivoting the fine tuning plate with a cam causes the optical element pin to cant, adjusting the position and/or angle of the optical element. In one embodiment of the present invention, a laser may be used to better align the optical element.

Other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an exemplary embodiment that is presently preferred, it being understood, however, that the invention is not limited to the specific methods and instrumentality's disclosed. In the drawings.

DETAILED DESCRIPTION OF THE PREFERRED EMBODIMENTS

Before explaining the disclosed embodiment of the present invention in detail, it is to be understood that the invention is not limited in its application to the details of the particular arrangement shown since the invention is capable of other embodiments. Also, the terminology used herein is for the purpose of description and not of limitation.

The present invention will be described in connection with a through-the-lens camera system, such as was described in U.S. Pat. No. 6,330,400, that patent incorporated by reference herein. However, although the preferred embodiment is being demonstrated in connection with this particular mirror assembly, this is not meant to be limiting. Rather, the present invention could be used with a wide variety of cameras and other imaging devices that require the fine tuning of internal mirrors or other optical elements, such as lenses.

Figure 1:
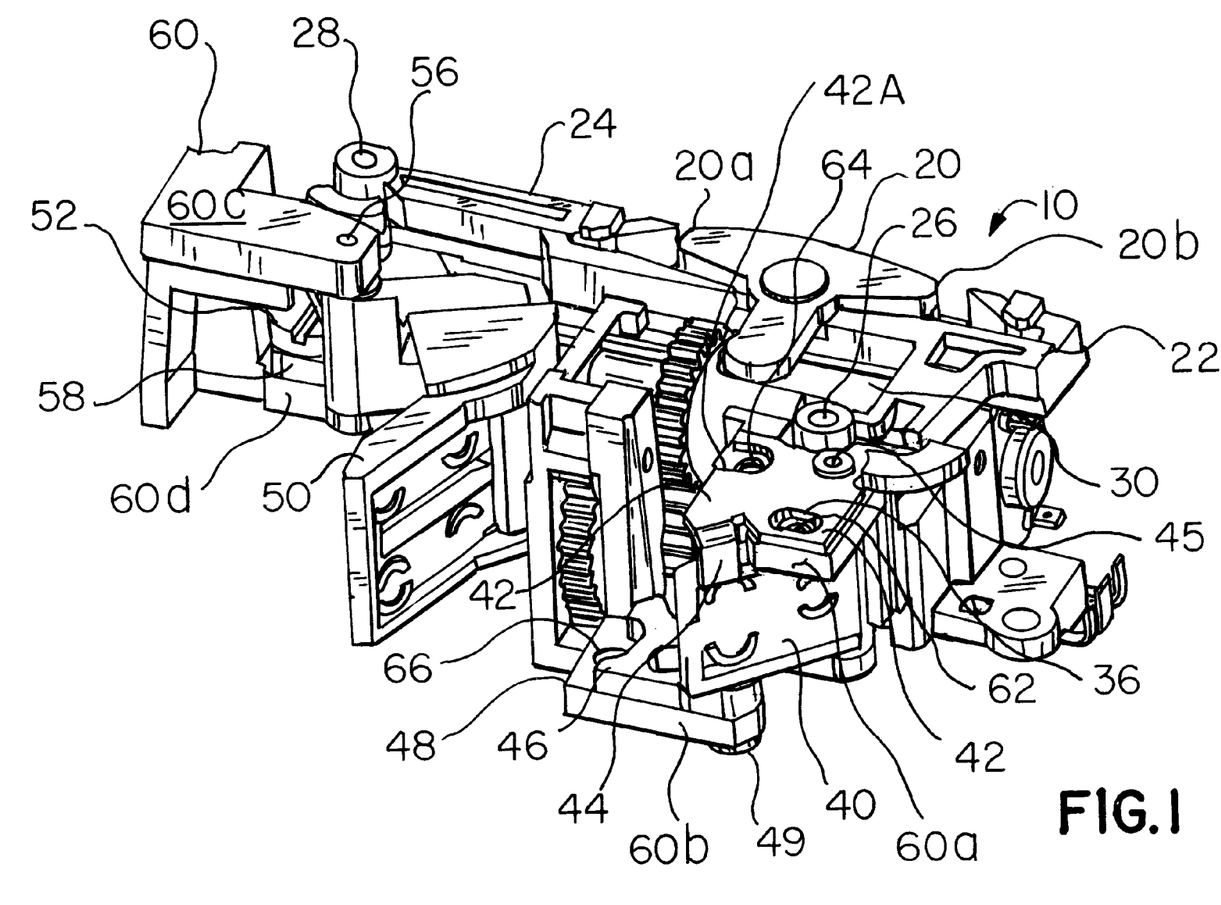
FIG. 1 is a perspective view of a mirror assembly unit that may be tuned using the present invention.

Referring now to FIG. 1, there is shown a mirror drive sub-assembly of an image capture device upon which several embodiments of the mirror alignment apparatus of the present invention may be practiced. A detailed description of the mirror drive assembly of FIG. 1 is described in connection with FIGS. 4–8 of the '400 patent, previously incorporated herein.

Mirror drive subassembly 10 includes two mirror support arms or frames 40 and 50, upon which mirrors may be mounted. The mirrors are supported by swinging support arms the position of which are controlled by the cam gear 30 that is connected to a generally T-shaped walker or rocking lever 20 fixed to the main body 60 of the mirror sub-assembly 10. As described in the '400 patent, rotational movement of the cam gear (108 of the '400 patent) is translated into lateral movement of the first and second mirror arms which are supported by the arms 20*a* and 20*b* of the rocking lever 20.

Mirror support arms 40 and 50 are pivotally connected to guide arm portions 22 and 24, respectively, with pivot pins 26 and 28, respectively. When the rocking lever 20 rocks, a force is applied by the guide arm portions 22 and 24 to the respective mirror support arms 40 and 50, causing the arms 40 and 50 to swing to their desired positions. In an image capture device of the type described in the '400 patent, the proper positioning of both mirror support arms 40 and 50 is vital to properly deflect the desired image (i.e. object to be captured or object already captured) to the viewfinder. In order to ensure proper positioning, the mirror support arms 40 and 50 are additionally pivotally connected to fine-tuning structures 42, 46 and 58. The fine tuning structures or plates 42, 46 and 58 of the present invention cooperate with fixed structures of the mirror sub-assembly main body 60. For example, the fine tuning plate 42 is initially fixed to main body portion 60*a* by the top end of the pivot pin 45. The fine tuning plate 46 is initially fixed to the main body portion 60*b* by the bottom end of the pivot pin 45. Additionally, the fine tuning plate 58 is initially linked to the mirror support arm 50 by the bottom end of pivot of pivot pin 56, the top end of which is fixed to main body portion 60*c*. As will be described later in connection with FIGS. 2 and 3, the fine tuning plate 58 is additionally pivotally fixed to the main body 60 at main body portion 60*d*. The position of the free end of the fine tuning plate 58 is adjusted using the cam screw 52.

Fine tuning plate 42 additionally includes an elongated set screw slot 36 therethrough. The set screw slot 36 is aligned with an internally threaded screw hole 62 in the main body portion 60a. An alignment hole 64 is additionally aligned with a cam surface 42a of the fine tuning plate 42. A stop surface 44 extends from the fine tuning plate 42 substantially perpendicular thereto.

Figure 2:
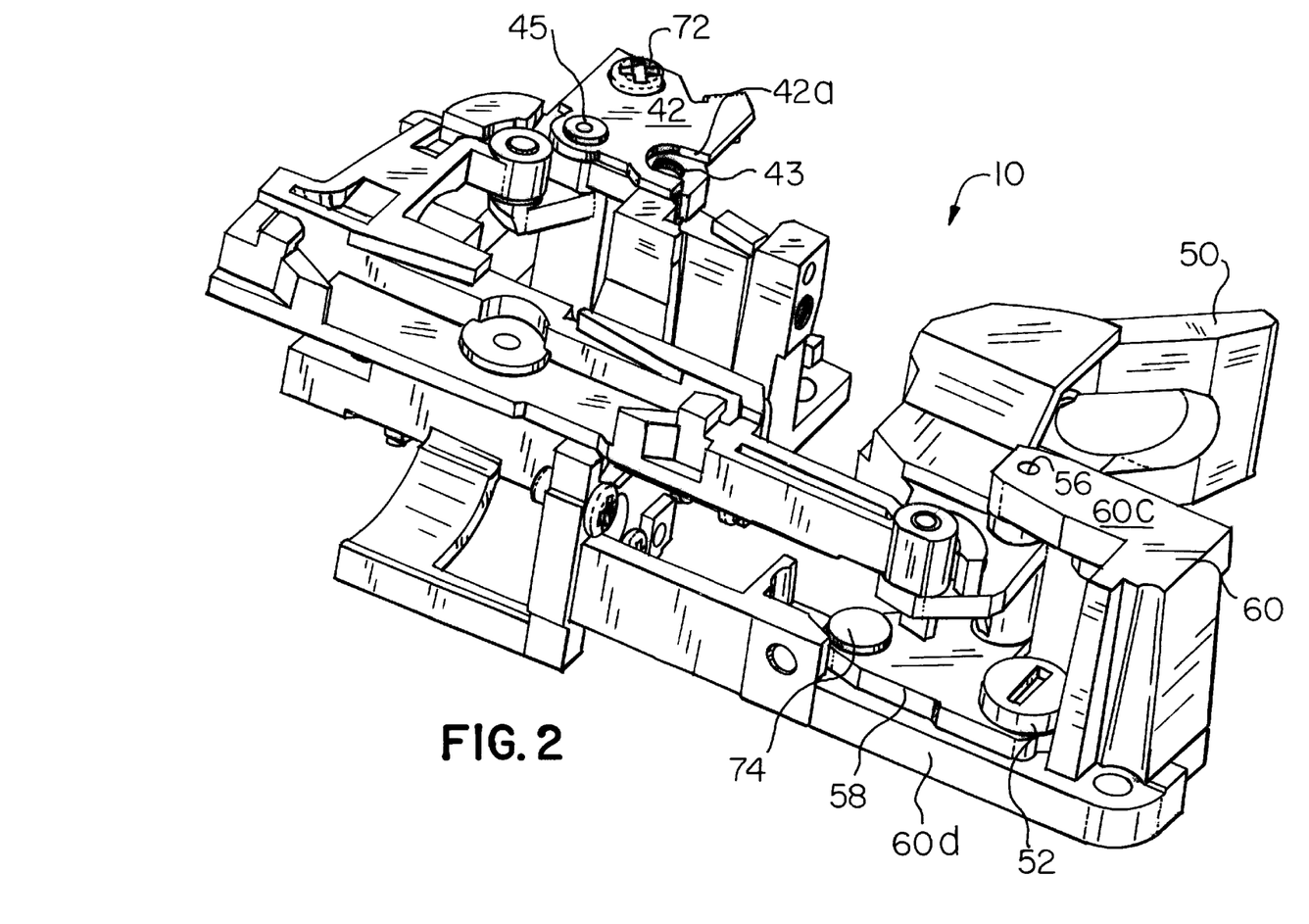
FIG. 2 is a rear partial perspective view of the mirror assembly unit of FIG. 1.
Figure 3:
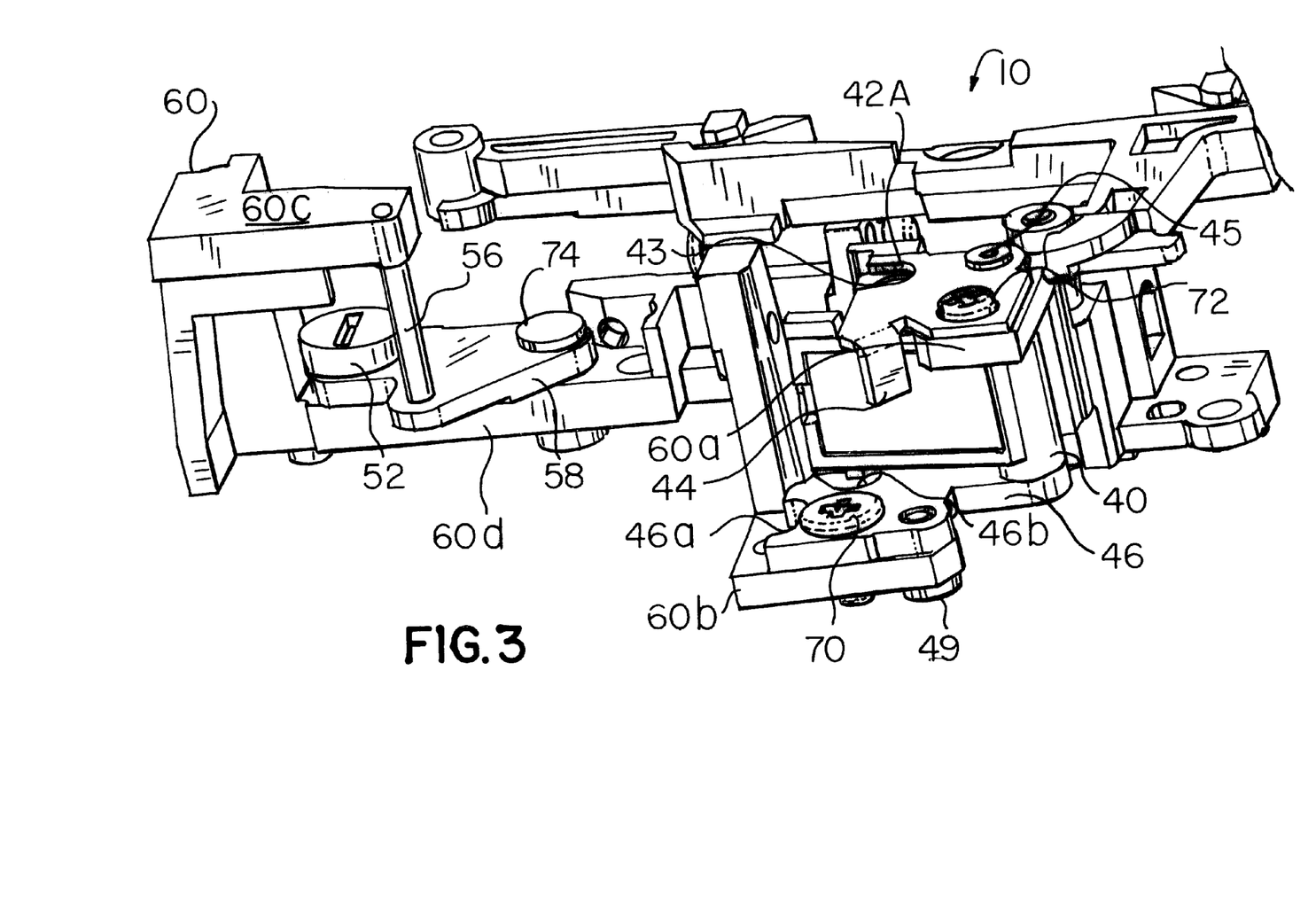
FIG. 3 is a front partial perspective view of the mirror assembly unit of FIG. 1.

Referring now to FIGS. 2 and 3, there is shown a portion of the mirror subassembly 10 that is involved in the fine tuning of mirror support arms 40 and 50. In a first embodiment of the fine tuning apparatus of the present invention, the fine tuning plate 58 is supported by the main body portion 60d. A pin 74 fixed at one end of the fine tuning plate 58 permits the structure 58 to pivot based on forces applied by the cam screw 52. The mirror support arm pivot pin 56 is fixed between the fine tuning plate 58 and the main body support surface 60c. A cam surface (not shown) but similar in structure to the cam surface 42a engages the cam screw 52. As will be described more fully below in connection with FIG. 5, rotation of the cam screw 52 causes movement of the fine tuning plate 58 relative to its pivot point at the pivot pin 74. This causes the mirror support arm pin 56 to cant, thus adjusting the position of the mirror support arm 50, and resultingly adjusting the position of the supported mirror.

Figure 4A:
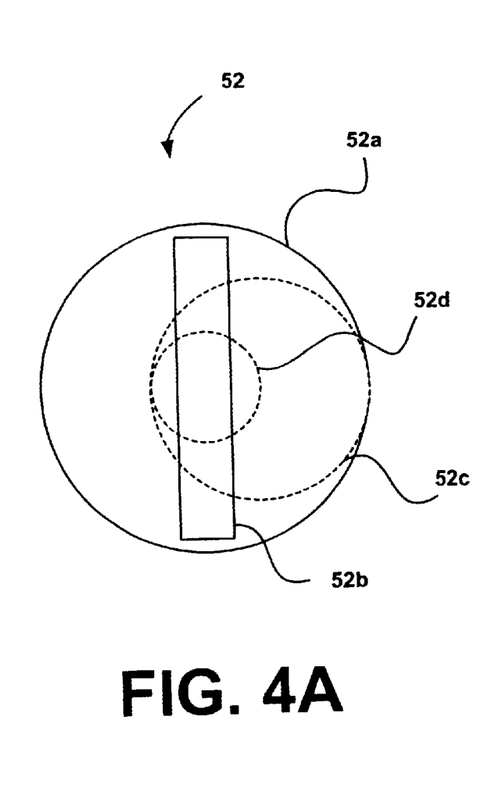
FIG. 4A is a top plan view of a cam screw useful with one embodiment of the present inventions
Figure 4B:
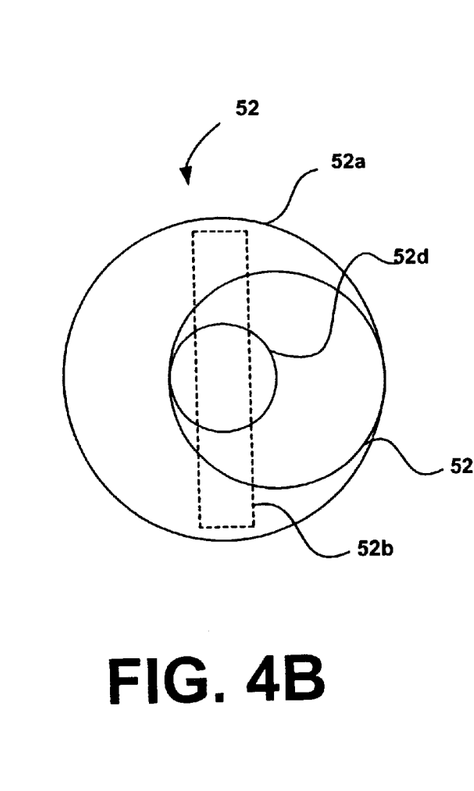
FIG. 4B is a bottom plan view of the cam screw of FIG. 4A.
Figure 4C:
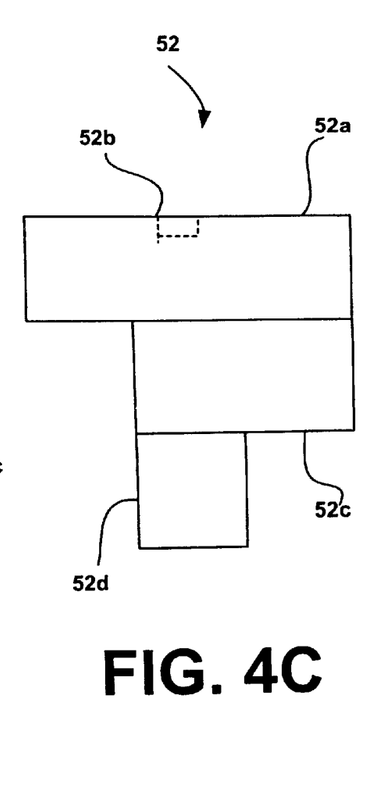
FIG. 4C is a side plan view of the cam screw of FIGS. 4A and 4B.

The form of cam screw 52 is illustrated in FIGS. 4A–4C. The cam screw 52 has a slotted head portion 52a including the slot 52b for engagement with a flat head screwdriver or the like. A shaft 52d extends from the slotted head portion 52a and is sized to tightly engage a hole through the main body portion 60d. The cam screw 52 of the present embodiment is not threaded. Rather, the shaft 52d is sized to maintain the cam screw 52 in a close frictional fit with the hole in the body portion 60d. A cam portion 52c is located below the slotted head 52a. The cam portion 52c is located between one edge of the slotted head 52a and an edge of the shaft 52d. As such it is not centered on the shaft 52c, but rather is eccentrically fixed to the cam screw 52.

Figure 6A:
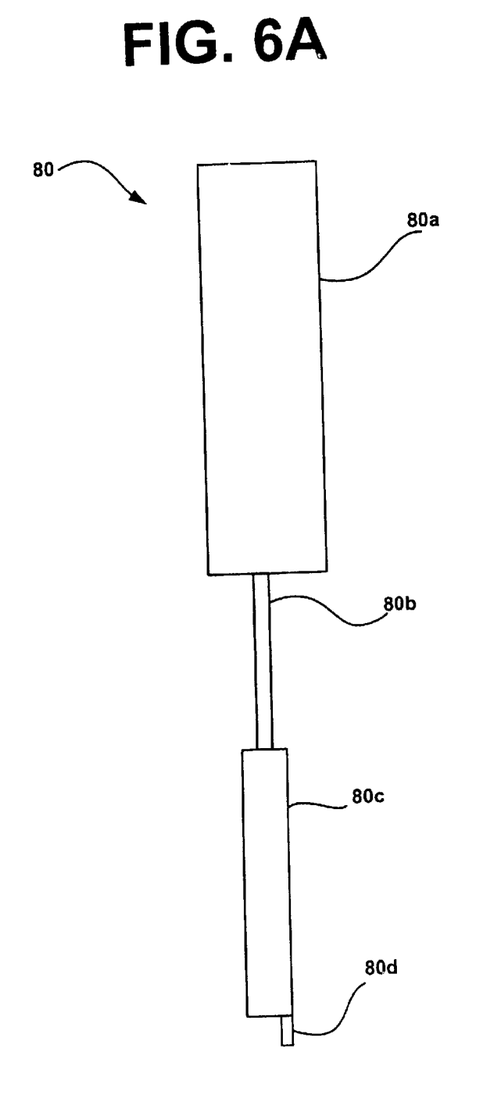
FIG. 6A is a side plan view of a cam wrench useful with one embodiment of the present invention.
Figure 6B:
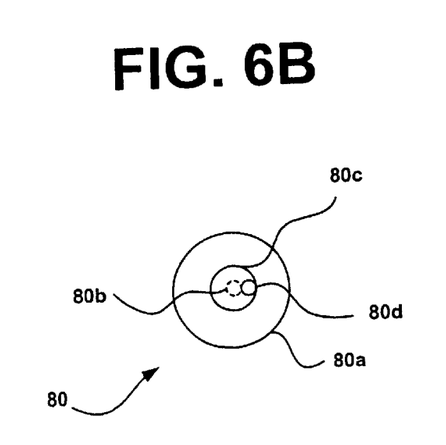
FIG. 6B is a bottom end plan view of the cam wrench of FIG. 6A.

Referring back to FIGS. 2 and 3, and to FIG. 6A–6B, another embodiment of the fine tuning apparatus of the present invention is used to adjust the second mirror support arm 40. Cam surfaces 46a and 46b are aligned with holes in the body portion 60b. Instead of including a cam screw, a cam wrench 80 is used to fine tune the position of the fine tuning plate 46. As with the cam screw 52, the cam wrench 80 includes a cam 80c that is eccentric relative to an alignment finger 80d. The cam 80Pc is further mounted to a handle 80a via a shaft 80b, which permits the wrench to be inserted behind the mirror support arm 40 from the top of the mirror sub-assembly 10. The fine tuning plate 46 is moved by the cam 80c of the wrench 80 relative to a pivot pin 49 fixed to the main body portion 60b. Mirror support arm pin 45 fixes the mirror support arm 40 to the fine tuning plate 46, which is supported by the main body portion 60b. Main body portions 60a and 60b are substantially parallel to each other. In the present embodiment, the top end of the mirror support arm pin 45 is fixed to the main body portion 60a and is the pivot point for the fine tuning plate 42. Alternately, the fine tuning plate 42 could be moveably secured to the body portion 60a by some other means, such that movement of the fine tuning plate 42 would result in movement of the top end of the pin 45, thus causing the mirror to cant relative to the bottom body member 60b or permitting the mirror support arm 40 to be moved laterally. After alignment using a cam wrench, the set screw 70 is tightened, fixing the fine tuning plate 46 to the main body portion 60b.

The fine tuning plate 42 is used to help fine tune the mirror support arm 40 by positioning the stop member 44. A cam wrench is aligned with the cam surface 42a by engaging the hole 43 in the main body portion 60a. As the cam wrench is turned, the fine tuning plate 42 pivots relative to the mirror support pin 45. When the stop member 44 is in the proper location to correctly limit the outward travel of the mirror support arm 40, the set screw 72 is tightened, fixing the fine tuning plate 42 to the main body support portion 60a.

Figure 5:
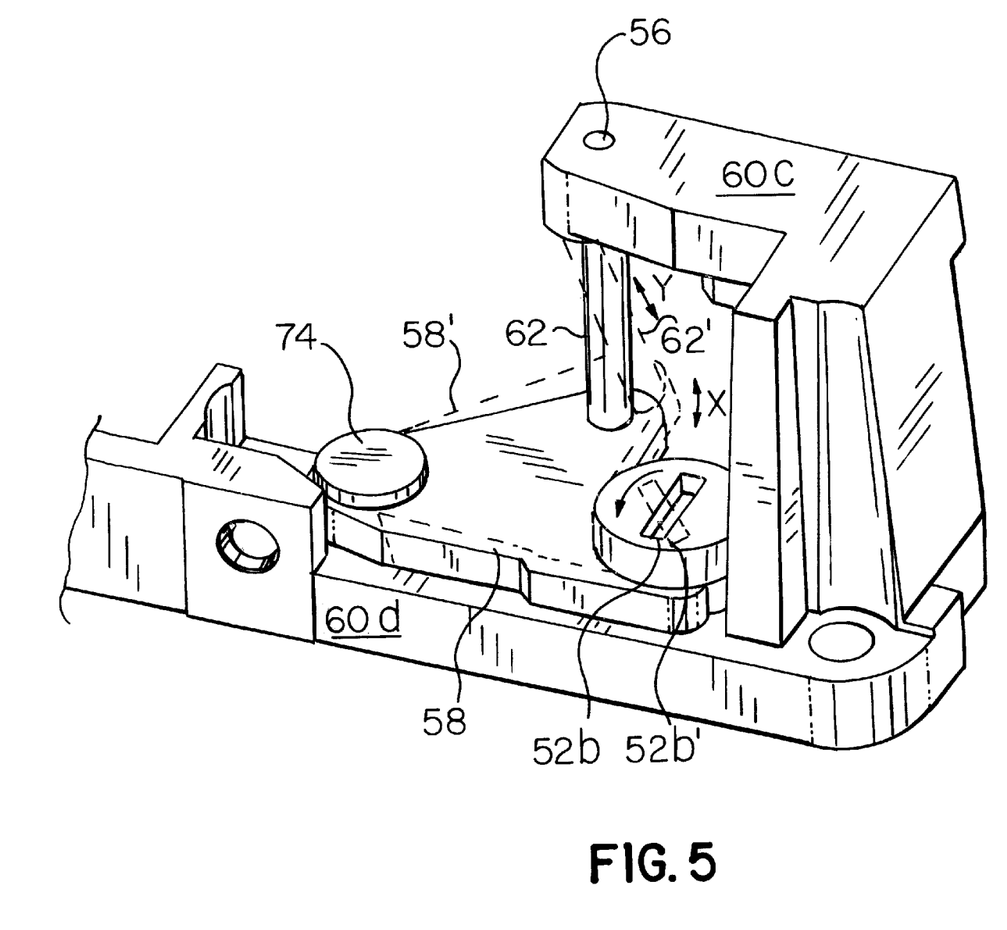
FIG. 5 is an enlarged perspective view of a select portion of the mirror assembly of FIG. 4.

Referring now to FIG. 5, there will be provided a description of the method of aligning the mirror support arm using the fine tuning plate 58 and the cam screw 52. As described, the cam (52c of FIGS. 4A–4C) engages a cam surface on the fine tuning plate 58, similar to the cam surface 42a of FIG. 3, such that rotation of the cam screw forces the fine tuning plate 58 to slide in the X plane relative to the pivot pin 74. Since the mirror support pin 56 is fixed at one end to the main body portion 60c, which is itself fixed to the main body portion 60d (60d being substantially parallel to 60c) of the mirror subassembly, the mirror support pin 56 cants relative to the fixed main body portion 60c. This causes the mirror support arm (50 of FIG. 1) to move not only in the X direction, but also to adjust its center up or down in the Y direction and to adjust the mirror angle.

In use, the mirror subassembly 10 is fixed in a fixture and the position of the mirror support arm is set (based on a predetermined position of the cam 30 of FIG. 1) and a laser beam (not shown) is shot into the sub-assembly. The cam screw 52 is turned until the fine tuning plate 58 brings the mirror directly into the line of sight of the laser beam. The displaced fine tuning plate 58' is shown in FIG. 5 in shadow. When the desired alignment is reached, turning of the cam screw 52 is discontinued, fixing the mirror in place.

Figure 7:
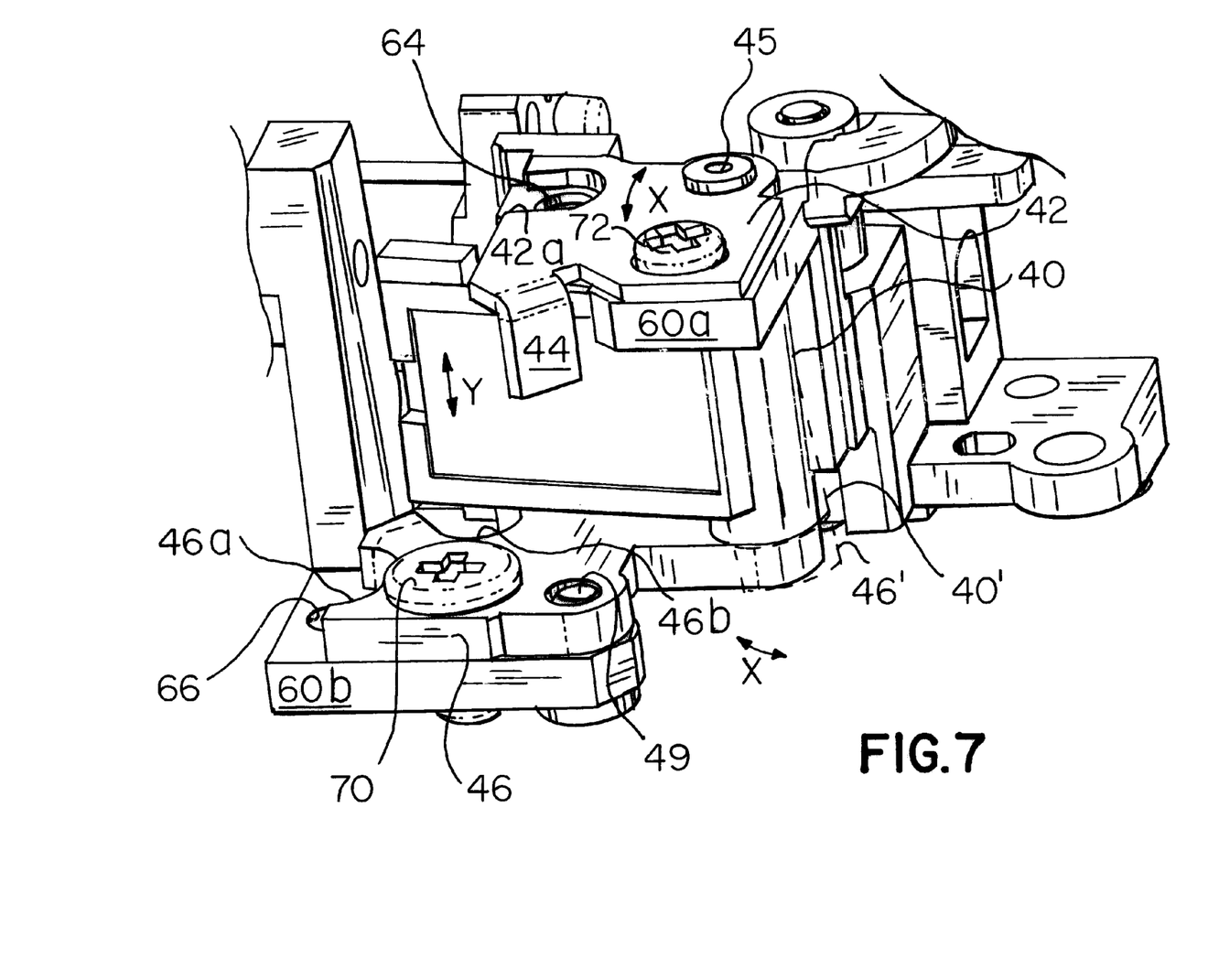
FIG. 7 is an enlarged perspective view of a select portion of the mirror assembly of FIG. 3.

Referring more specifically to FIGS. 6 and 7, there is shown a method of aligning a mirror using the cam wrench 80. The set screw 72 is loosened, permitting the fine tuning plate 42 to pivot in the X axis relative to the pivot pin 45 and the mirror support arm 40 is pressed into contact with the support member 44. Using a laser beam 90 from laser 95, as described in connection with FIG. 5, the alignment finger 80d is inserted into the alignment hole 64 and the wrench 80 is turned (manually in one preferred embodiment) driving the cam 80c against the cam surface 42a. As the wrench is rotated, the fine tuning plate 42 pivots. When the mirror is aligned with the laser beam 90, the set screw 72 is tightened, fixing the outer limit of the mirror in place.

Additionally, the height of the mirror can be adjusted using the laser beam and wrench method described above. Inserting the alignment finger 80d of the wrench 80 into the alignment hole 66 brings the cam 80c into contact with the cam surface 46a. When the set screw 70 is loosened, turning the cam wrench 80 forces the fine tuning plate 46 to pivot in the X plane. This causes the pivot pin 45 to cant relative to the fixed end in main body portion 60a, thus moving the mirror support arm 40 up and down in the Y direction and adjusts the mirror angle. When the mirror is properly aligned with the laser beam 90, the set screw 70 is tightened, fixing the fine tuning plate 46 to the main body portion 60b and fixing the mirror height and angle. The displaced fine tuning plate 46' is shown in FIG. 7 in shadow.

In order to align the mirrors of the mirror assembly 10 of FIG. 1, both methods described in connection with FIGS. 5 and 7 are practiced. As such, the laser beam 90 is aligned with each mirror individually when the mirror support arms 40 and 50 are correctly aligned in their desired positions.

Although the above preferred embodiments have been described in a multiple mirror system, it can be seen that the methods and apparatus for aligning the individual mirrors of the present invention can be used to align a mirror in a single mirror system. Further, the methods and apparatus for aligning can be used in a system wherein the mirror does not swing (as in the '400 patent) but is fixed into place but needs precise alignment. Although the present preferred embodiments show the use of a cam screw 52 and wrench 80, it can be seen that a cam screw 52 could have been used where the wrench 80 was used and vice versa. Further, although the fine tuning plates are shown as being pivotally fixed to the main body portions that support them, other methods of moveably fixing the plate to the body member may be used. For example, pivot 74 may be replaced by a set screw seated in a guide slot. Additionally, although the system has been described in connection with fine tuning mirrors, it can be seen that other optical elements, such as lenses, could be fine tuned using the methods and apparatus of the present invention.

While the invention has been described with reference to a preferred embodiment, it will be understood by those skilled in the art that various changes may be made and equivalents may be substituted for elements thereof without departing from the scope of the invention. In addition, many modifications can be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An optical element sub-assembly, comprising:
   a first main body portion;
   a second main body portion fixed substantially parallel to said first main body portion;
   a fine tuning plate moveably fixed to said second main body portion, said fine tuning plate comprising;
   an optical element frame;
   an optical element set in said optical element frame;
   a pin having a first end attached to said first main body portion, an opposite second end attached to said fine tuning plate and said optical element frame attached therebetween;
   a mechanism to move said fine tuning plate relative to said second main body portion; and
   whereby movement of said fine tuning plate results in the movement of said optical element frame on said pin.

2. The optical element sub-assembly of claim 1, wherein said mechanism includes a cam mechanism engaged with a cam surface on said fine tuning plate.

3. The optical element sub-assembly of claim 2, wherein said cam is part of a cam screw.

4. The optical element sub-assembly of claim 2 wherein said cam is part of a cam wrench tool.

5. The optical element sub-assembly of claim 1, wherein said optical element is a mirror.

6. The optical element sub-assembly of claim 5, wherein said fine tuning plate is pivotally fixed to said second body member.

7. The optical element sub-assembly of claim 6, including a second fine tuning plate moveably fixed to said first main body portion.

8. The optical element sub-assembly of claim 7, wherein said second fine tuning plate additionally includes a cam surface.

9. The optical element sub-assembly of claim 5, wherein the mirror sub-assembly includes a second optical element.

10. The optical element sub-assembly of claim 9, wherein said second optical element is contained in a second optical element frame and wherein the mirror sub-assembly further includes a third main body portion and a fourth main body portion fixed substantially parallel to said third main body portion, a second fine tuning plate moveably fixed to said fourth main body portion;
    a second pin having a first end attached to said third main body portion, an opposite second end attached to said second fine tuning plate and said optical element frame attached therebetween;
    a second cam to move said second fine tuning plate relative to said fourth main body portion; and
    whereby movement of said second fine tuning plate results in the movement of said second optical element frame on said second pin.

11. The optical element sub-assembly of claim 10, wherein said second cam is the same as said first cam.

12. A method of aligning an optical element in an optical element sub-assembly, comprising the steps of:
    providing an optical element sub-assembly, comprising,
    a first main body portion;
    a second main body portion fixed substantially parallel to said first main body portion;
    a fine tuning plate moveably fixed to said second main body portion;
    an optical element frame;
    an optical element set in said optical element frame;
    a pin having a first end attached to said first main body portion, an opposite second end attached to said fine tuning plate and said optical element frame attached therebetween;
    a mechanism to move said fine tuning plate relative to said second main body portion;
    directing a laser beam at a desired position of said optical element;
    moving said fine tuning plate relative to said second body member with said mechanism to bring said optical element in alignment with said laser beam.

13. The method of claim 12, including the step of fixing said fine tuning plate to said second body member after said moving step.

14. The method of claim 12, wherein said mechanism includes a cam mechanism engaged with a cam surface on said fine tuning plate.

15. The method of claim 14, wherein said cam is a cam screw.

16. The method of claim 14, wherein said cam is a cam wrench tool.

17. The method of claim 14, wherein said second optical element is contained in a second optical element frame and wherein the mirror sub-assembly further includes a third main body portion and a fourth main body portion fixed substantially parallel to said third main body portion, a second fine tuning plate moveably fixed to said fourth main body portion;
    a second pin having a first end attached to said third main body portion, an opposite second end attached to said second fine tuning plate and said optical element frame attached therebetween;
    a second cam to move said second fine tuning plate relative to said fourth main body portion.

18. The method of claim 17, including the further step of moving said second fine tuning plate with said second cam to bring said optical element in alignment with said laser beam.

19. The method of claim 18, wherein said first cam and said second cam are the same cam.

\* \* \* \* \*